United States Patent [19]

Li et al.

[11] Patent Number: 5,745,619
[45] Date of Patent: Apr. 28, 1998

[54] LOW-LOSS OPTICAL POWER SPLITTER FOR HIGH-DEFINITION WAVEGUIDES

[75] Inventors: Yuan P. Li, Duluth; Yan Wang, Chamblee, both of Ga.

[73] Assignee: Lucent Technologies Inc., Murray Hill, N.J.

[21] Appl. No.: 660,245

[22] Filed: Jun. 7, 1996

[51] Int. Cl.$^6$ .................................................. G02B 6/26
[52] U.S. Cl. ............................ 385/48; 385/45; 385/43; 385/42
[58] Field of Search .................... 385/48, 41, 42, 385/43, 44, 45, 46, 47

[56] References Cited

U.S. PATENT DOCUMENTS

| | | | |
|---|---|---|---|
| 5,091,986 | 2/1992 | Arii et al. | 385/48 |
| 5,412,744 | 5/1995 | Dragone . | |
| 5,436,992 | 7/1995 | Wang et al. | 385/45 |
| 5,524,156 | 6/1996 | Van Der Tol | 385/45 X |
| 5,586,209 | 12/1996 | Matsuura et al. | 385/43 |

OTHER PUBLICATIONS

Hibino, et al., "High Reliability Optical Splitters Composed of Silica–Based Planar Lightwave Circuits," *J. of Lightwave Technology*, vol. 13, pp. 1728–1735, 1995. no month.

Henry, et al., "Solution of the Scalar Wave Equation for Arbitrarily Shaped Dielectric Waveguides by Two–Dimensional Fourier Analysis," *J. of Lightwave Technology*, vol. 7, No. 2, pp. 308–313, Feb., 1989.

Hatami–Hanza, et al., "A Novel Wide–Angle Low–Loss Dielectric Slab Waveguide Y–Branch," *J. of Lightwave Technology*, vol. 12, No. 2, pp. 108–213, Feb., 1994.

*Primary Examiner*—Phan T. H. Palmer
*Attorney, Agent, or Firm*—Donald E. Hayes, Jr.

[57] ABSTRACT

This invention relates to a novel design for a low-loss optical power splitter, in particular Y-branch types resulting from chemical vapor deposition (CVD) fabricated silica waveguides. More specifically, the present invention utilizes mode matching of the fundamental modes between the input and the output waveguides of a splitter to optimize the splitters operational performance. The optical power splitter of the present invention comprising an input waveguide region having a predetermined width (W) and capable of transmitting optical energy having a fundamental mode $E_1^0$. Additionally, the splitter includes at least two output waveguide regions positioned to receive at least a portion the optical energy from the input waveguide region wherein the output waveguide regions each have predetermined widths (w) and are capable of transmitting optical energy having a fundamental mode $E_2^0$; and wherein each pair of output waveguide regions are separated by a gap of a predetermined width (d) therebetween. Lastly, the operational performance of the splitter is enhanced in accordance with the present invention as a result of purposely selecting certain physical properties of the splitter design such that the fundamental modes $E_1^0$ and $E_2^0$ are substantially equal at the beginning of the output waveguide regions. Mode matching of the fundamental modes between the single input and the dual output waveguides of a splitting Y junction was central to achieving the improved performance.

20 Claims, 6 Drawing Sheets

(d = 1.5 μm)

(d = 2.0 μm)

(l < 0)

(l = 0)

(l > 0)

(w1 ≠ w2)

(t ≠ 0)

(1 × N)

(1 X 8 SPLITTER)

(1 X 16 SPLITTER)

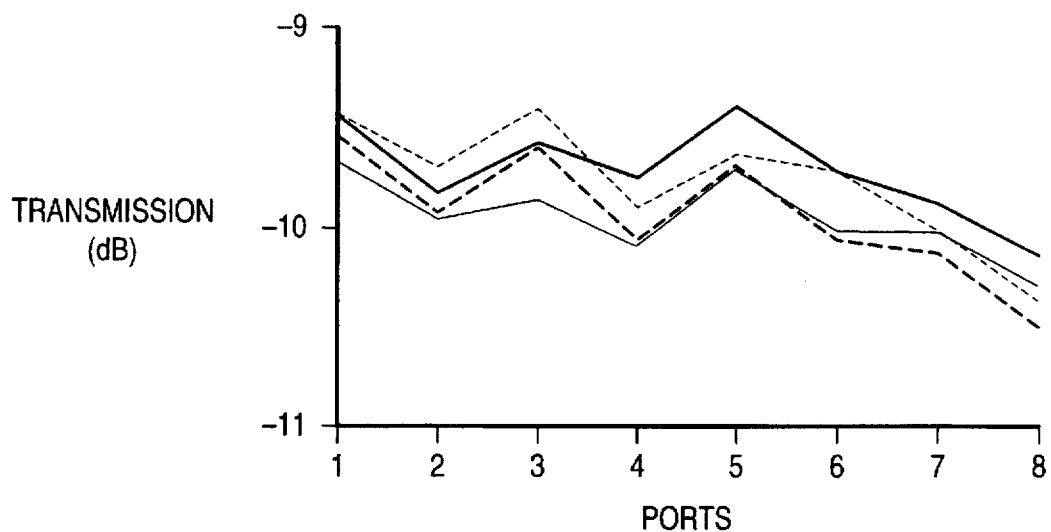
FIG 8a
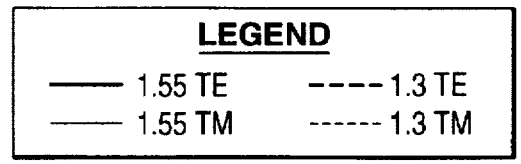
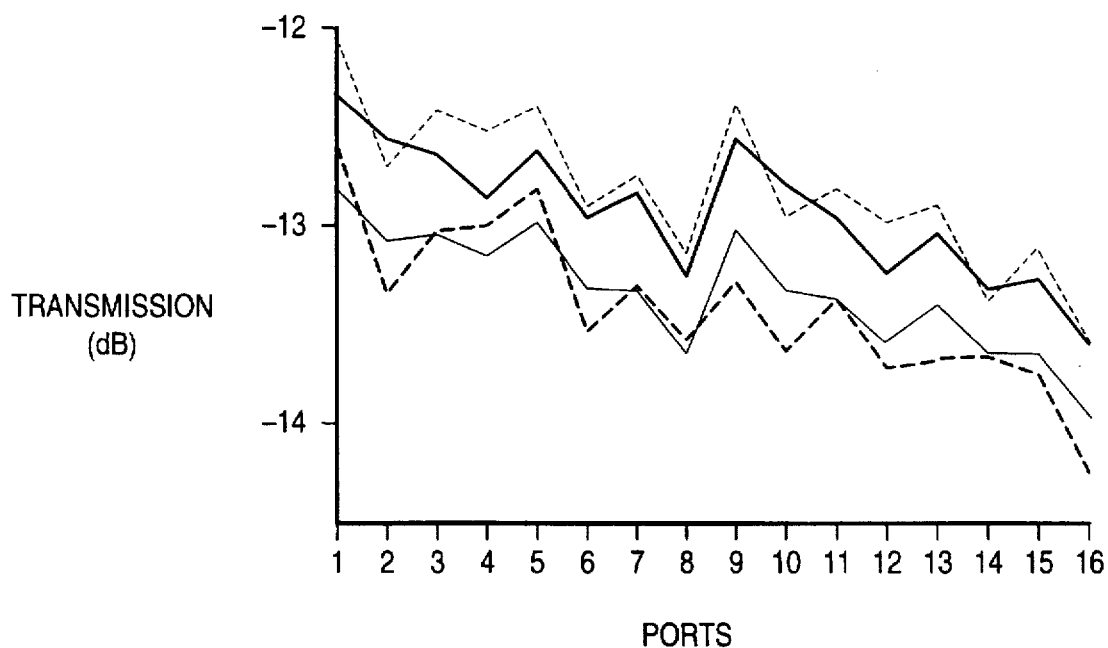
FIG 8b
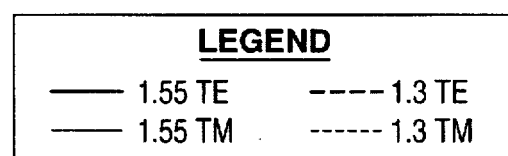

LOW-LOSS OPTICAL POWER SPLITTER FOR HIGH-DEFINITION WAVEGUIDES

TECHNICAL FIELD

This invention relates to a novel design for a low-loss optical power splitter. More particularly, the present invention utilizes mode matching of the fundamental modes between the input and the output waveguides of a splitter to optimize the splitters operational performance.

BACKGROUND OF THE INVENTION

The needs of communications encompass a wide spectrum of optical technologies. At one end of the spectrum are compound semiconductor devices, lasers and detectors, which are evolving into photonic integrated circuits. At the other end are optical fibers which are also used as discrete passive components such as 3 dB couplers and Bragg reflection filters. In between, there are other technologies such as optical isolators and broad-band thin film filters. One particular optical technology that is increasingly used to supply components for optical communications includes passive optical waveguide circuits. This technology is often made from doped silica films deposited on silicon substrates and referred to as silicon optical bench (SiOB) optical integrated circuits (OICs).

As optical communications advance, more and more passive optical components are needed. For example, broad-band multiplexers can deliver voice and video to the home, combine pump and signals in an optical amplifier and add a monitoring signal to the traffic on optical fibers. Dense wavelength division multiplexing (WDM) systems may use multiplexers to combine and separate channels of different wavelengths and also use add drop filters to partially alter the traffic. Lastly, splitters, star couplers and low speed optical switches provide important contributions in broadcast applications.

One might think that there is no need for passive OICs, since optical fiber components can perform many optical functions with relatively low loss. However, planar integration of such devices brings a number of unique new advantages. Compactness becomes important when going from the laboratory to actual operational applications, where all functions are squeezed into small modular containers and inserted into relay racks, e.g., 1×16 splitters made on a single chip instead of the fusing discrete optical fiber 1×2 splitters together. Reduced cost is achieved when complex functions are integrated, saving manual interconnections, as well as when many chips are made from the processing of a single wafer. Such concerns will become increasingly important as optical communications begins to serve individual subscribers.

It is the design and manufacture of splitter components within this array of passive optical components that the present invention is concerned. More specifically, the present invention describes new design characteristics for power splitters, particularly Y-branch types, that significantly enhance the operational performance of such components within an optical communications application.

As stated above, optical power splitters are essential functional elements for integrated optics devices. To date, splitters have been used as power dividers/combiners in modulators, switches, interferometric devices, semiconductor laser arrays, and planar silica-based waveguide lasers. In order to appropriately function within the variety of intended applications, splitters must exhibit operational characteristics which include 1) low insertion loss, 2) wavelength independence and 3) low polarization sensitivity.

Typically, a Y-branch junction power splitter consists of a single waveguide splitting gradually and symmetrically into two waveguides. While a single Y-branch is commonly used as a 1×2 power splitter, multiple Y-branch splitters often are cascadingly combined into $1 \times 2^N$ optical power splitters. Such a splitter is composed of N cascaded stages of Y-branches to form $2^N$ output ports. This type of enhanced configuration establishes components which are critical for the construction of expansive optical networks such as fiber-to-the-home systems.

In general, the geometric symmetry of a Y-branch junction power splitter is designed to prevent conversion of the fundamental mode into any asymmetric mode. Ideally, the waveguide splitting transition is adiabatic, i.e. generally tapered, which prevents conversion of the fundamental mode into higher order symmetric modes. Achieving these two conditions facilitates an equal power split with little excess loss.

In practical fabrication, however, the minimum width of the gap between output waveguides is limited by the reliable and repeatable resolution of the photo-lithography and/or chemical etching processes employed. As a result, the sudden opening of this gap violates the adiabatic condition, resulting in an extra insertion loss. Some existing fabrication processes, such as inter-diffusion of the core and cladding materials, somewhat effectively smear the abrupt gap opening and reduce the insertion loss, but these processes are not available for all fabrication systems.

Due to the difficulty in the practical realization of a high quality optical splitter, the development of a consistently low-loss, uniform splitter has been a challenge for designers. A variety of Y-branch structures have been analyzed by using methods such as coupled-mode theory, normal mode analysis, volume current method, and Beam Propagation Methods (BPM). Recently, a fabricated low-loss Y-branch was reported with low refractive index differential ($\Delta$) 0.3% flame hydrolysis waveguides and a high-temperature processing (annealing) step which can effectively smear the abrupt gap opening. As used herein and accepted throughout the industry, the refractive index differential ($\Delta$) is the percentage change between the refractive index of the core material ($n_{core}$) to the refractive index of the clad material ($n_{clad}$), $\Delta=(n_{core}-n_{clad})/(n_{core})$. This reporting can be found in an article by Hibino, F. Hanawa, H. Nakagome, M. Ishii, and N. Takato, entitled "High reliability optical splitters composed of silica based planar lightwave circuits," and printed in the *Journal Lightwave Technology*, vol. 13, pp. 1728–1735, 1995. Unfortunately, this low loss is expected to increase with higher $\Delta$ values and for lower temperature fabrication systems such as chemical vapor deposition (CVD). Additionally, commonly assigned U.S. Pat. No. 5,412,744 issued to Dragone, which is expressly incorporated by reference herein, references matching some modes of an optical signal to assist in producing a flat passband in a wavelength multiplexer.

However, even in light of the teachings of the prior art, it is desirable to combine the splitter function with other waveguide functions, some of which would be deliteriously affected by the annealing step. Therefore it is desirable to develop and design a splitter structure, particularly Y-branch type, which only uses processing steps that are common to all waveguide functional elements, that have good photo-lithographic definition, and are compatible with high-$\Delta$ waveguides.

SUMMARY OF THE INVENTION

This invention relates to a novel design for a low-loss optical power splitter, in particular Y-branch types. More specifically, the present invention utilizes mode matching of the fundamental modes between the input and the output waveguides of a splitter to optimize the splitters operational performance. The optical power splitter of the present invention comprising an input waveguide region having a predetermined width (W) and capable of transmitting optical energy having a fundamental mode $E_1^0$. Additionally, the splitter includes at least two output waveguide regions positioned to receive at least a portion the optical energy from the input waveguide region wherein the output waveguide regions each have predetermined widths (w) and are capable of transmitting optical energy having a fundamental mode $E_2^0$; and wherein each pair of output waveguide regions are separated by a gap of a predetermined width (d) therebetween. Lastly, the operational performance of the splitter is enhanced in accordance with the present invention as a result of purposely selecting certain physical properties of the splitter design such that the fundamental modes $E_1^0$ and $E_2^0$ are substantially equal at the beginning of the output waveguide regions.

BRIEF DESCRIPTION OF THE DRAWINGS

Other features of the present invention will be more readily understood from the following detailed description of specific embodiments thereof when read in conjunction with the accompanying drawings, in which:

FIG. 8 is a measured insertion loss for the splitters in accordance with the present invention (a) 1×8 and (b) 1×16.

DETAILED DESCRIPTION OF THE PREFERRED EMBODIMENT

Figure 1A:
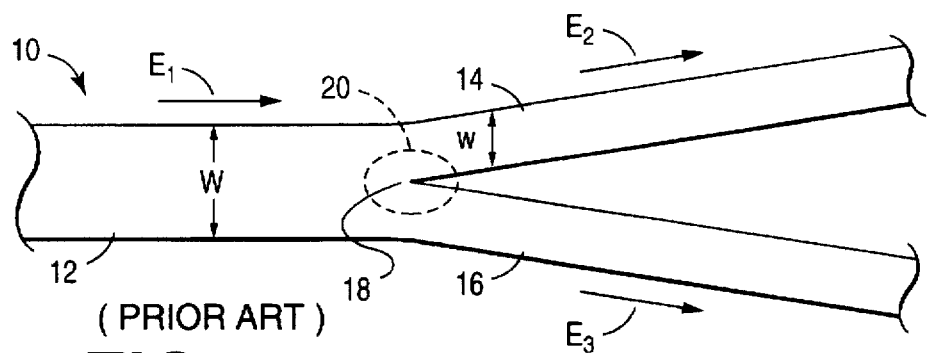
FIG. 1(a) and (b) are schematics of an ideal Y-branch and a conventional Y-branch, respectively.
Figure 1B:
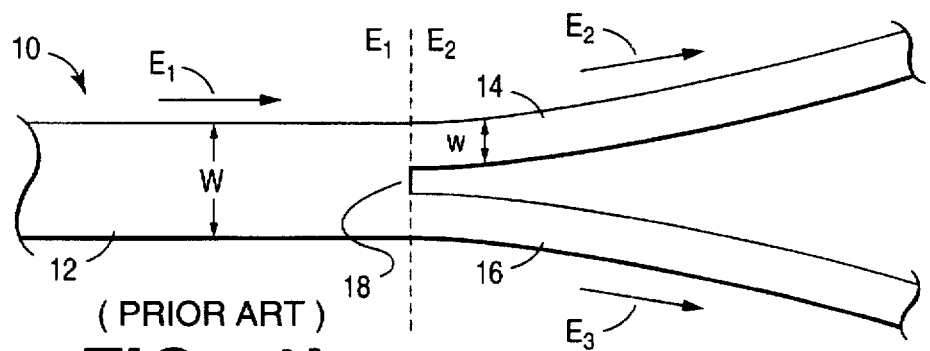

The structure for an ideal Y-branch junction power splitter, as well as practically existing designs where minium gap size is limited by fabrication techniques, are shown in FIGS. 1(a) and (b) respectively and generally depicted as numeral 10. An electromagnetic mode field, $E_1$, propagates along the single waveguide 12 and splits into the dual waveguide region, depicted by waveguide portions 14 and 16 and electromagnetic mode fields, $E_2$ and $E_3$, at the Y junction 18. Additionally, FIG. 1 identifies the width dimension of the single waveguide 12 and waveguide pairs 14 and 16 as W and w, respectively.

Ideally, the input power $E_1$ is divided equally between the two waveguide arms 14 and 16. In this regard an attempt to achieve equal power splitting and to minimize coupling of the fundamental mode to the asymmetric mode, a symmetrical geometry is used. In order to reduce excess loss, the waveguide splitting transition should be gradual enough (adiabatic) to limit conversion of the fundamental mode into higher order symmetric modes.

The structural concept of an optical power splitter appears simple enough, yet as stated earlier, it has not been a trivial task, in practice, to design and fabricate a low loss splitter. The major difficulty stems from the limited resolution of the photolithography and undercut during the etching processes in producing the waveguide 10. These fabrication limitations define a minimum width of the Y-junction or gap 18 between two waveguides 14 and 16 at the splitting junction or where the output waveguide regions actually begins. As a result, the gap 18 between the waveguide pair 14 and 16 opens suddenly to a finite width (typically about 2 μm based on current technology). This sudden, nonadiabatic opening of the gap results in an excess loss at the Y-junction 18. Furthermore, and of at least equal importance, with existing design and manufacturing techniques, the width and position of the gap unfortunately varies in an unpredictable and uncontrolled fashion, resulting in varied and unequal splitting of optical power through to the two output ports 14 and 16 of a series of devices. In this regard, FIG. 1 highlights the region which introduces extra excess loss with a dotted circle 20.

Figure 3:
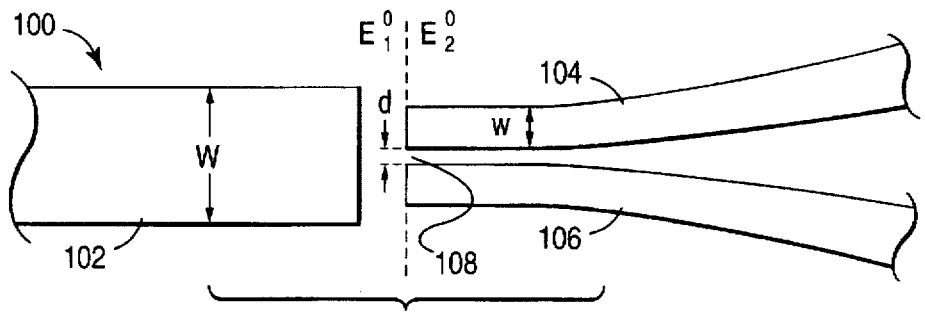
FIG. 3 is a schematic of a Y-branch optical splitter in accordance with the present invention.

The present invention describes new design characteristics for optical power splitters, particularly Y-branch junctions, that significantly enhance the operational performance of such components within an optical communications application. In general, the present invention utilizes the principles of mode matching at the splitting interface of Y-branch to optimize the physical dimensions of the device. More specifically, in accordance with the present invention, a 2-D mode solver with Fourier expansion methods is used, without necessarily having to employ Beam Propagation Methods (BPM). The mathematical specifics of this solver will be discussed in greater detail later. Additionally, the particular configuration of the optical power splitter in accordance with the present invention is shown in FIG. 3 and will also be presented in greater detail after a brief discussion of some wave theory which serves as a backbone of the present invention.

In general, an optical waveguide directs the propagation of an electromagnetic field through a nearly lossless doped silica medium. The transmission loss, transmission spectrum, and their polarization dependence are the basic parameters used to characterize the optical performance of waveguide devices. These performance characteristics may be measured both on diced wafers and devices with fiber pigtails attached. To measure a wafer, fibers are butt coupled to the waveguides using computer controlled translation stages, similar to the active fiber alignment described earlier. An index matching oil is used to fill the gap between the fiber and the waveguide to reduce back reflection. The transmission loss at a given wavelength can be measured using a laser as light source and a power meter as the detector. The transmission spectrum can be measured using an optical spectrum analyzer and one or more LEDs as a high power broadband light source. Alternatively, a tunable light source (e.g., an external cavity laser) and a power meter can be used. To measure the polarization dependence of a device on an unpackaged wafer, the source light is usually launched into the waveguide with a predefined polarization TE (E field parallel substrate) or TM (E field normal substrate), using, for example, a polarization splitter and a polarization maintaining fiber. Lastly, for a packaged device, even if the light launched into the pigtail fiber has a known polarization, the polarization at the waveguide device depends on the arrangement of the pigtail fiber. Therefore, a computer controlled polarization rotator is often used to measure the transmission of many polarization states. The results are then used to derive the polarization dependence of the waveguide device transmission.

Electromagnetic fields obey Maxwell's equations. Because the changes in refractive index n(x) are small, Maxwell's equations reduce to a scalar wave equation for the transverse electric field. In steady state behavior at a single wavelength $\lambda$ and polarization, the scalar wave equation is $$\nabla^2 E(x) + [4\pi^2/\lambda^2] n(x)^2 E(x) = 0 \quad (1)$$

For propagation along a waveguide in the z direction, the refractive index depends only on x and y. The field can be written as the sum of propagating transverse modes. Each mode field has the form $E(x) = \Phi(x,y) e^{ik_z z}$, where the propagation constant $k_z$ can be expressed in terms of an effective refractive index n, $k_z = 2\pi n/\lambda$. The wave equation for the transverse mode reduces to $$[\lambda^2/4\pi^2][(\partial^2/\partial x^2) + (\partial^2/\partial y^2)]\Phi(x,y) + n(x,y)^2 \Phi(x,y) = n^2 \Phi(x,y) \quad (2)$$

The above equation is equivalent to a two-dimensional steady state Schrodinger equation with the potential V(x,y) proportional to $-n(x,y)^2$, the mass m proportional to $\lambda^{-2}$ and the energy eigenvalue E proportional to $-n^2$:

$$[h^2/2m][(\partial^2/\partial x^2) + (\partial^2/\partial y^2)]\Psi(x,y) - V(x,y)\Psi(x,y) = -E\Psi(x,y). \quad (3)$$

Figure 2:
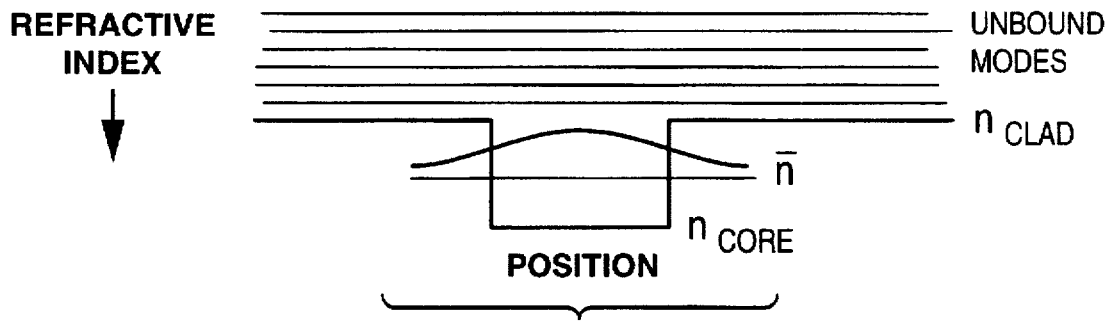
FIG. 2 is a graphical depiction of the refractive index profile and modes of an optical waveguide.

This equivalence helps us understand the behavior of optical waveguide modes, which is illustrated in FIG. 2. A local increase in refractive index acts as an attractive potential well that confines the light into a bound mode in the same way that such a potential well confines an electron into a bound state. This analogy is illustrated in FIG. 2. Bound states only occur with n between $n_{core}$ and $n_{clad}$. For smaller values of n, there is a continuum of unbound or radiation modes.

As understood throughout the industry, a number of different factors may contribute to the propagation of the fundamental mode of an optical signal through a waveguide. Because the Y-branch splitter is used typically in single-mode fiber systems, the fundamental mode is the primary focus of the design technique.

Before addressing its particulars, it should be noted that while the preferred embodiment of the splitters in accordance with the present invention is directed to components manufactured using chemical vapor deposition (CVD) techniques, it is understood that other techniques for forming thick silica films for optical waveguides, such as flame hydrolysis deposition (FHD) and e-beam deposition, are also suitable in accordance with the present invention.

The proposed splitter structure of the present invention, as a Y-branch design, is shown in FIG. 3 and generally depicted as element 100. The Y-branch junction power splitter 100 contains a single waveguide 102 having an ending width W followed by two identical waveguides 104 and 106 having widths w. In addition to the width dimensions or parameters of W and w, a third dimension or parameter d is introduced to represent the width of a gap 108 between the pair of waveguides 104 and 106. The gap region 108, which has a width generally referenced as d and is located at the split between pair of waveguides 104 and 106, is at least as large as the reliably repeatable resolution of current photolithography techniques (presently about 2 µm). When d=0, the configuration reduces to the ideal Y-junction, however, with existing photolithography techniques such a physical configuration can not be achieved. The fundamental mode fields for the single and double waveguide regions are denoted by $E_1^0$ and $E_2^0$ respectively. The principle of the present invention for reducing the excess loss in this Y-branch is maximizing the mode match at the junction. In other words, $E_1^0$ is substantially equal to $E_2^0$ at the physical point where the double waveguide region truly begins (see FIG. 5).

In this context, the power transmission coefficient through the junction is defined by;

$$P = -10 \log[C_{12}(W,w,d)]^2, \quad (4)$$

where, $$C_{12}(W,w,d) = \int E_1^0(x,y,W) E_2^0(x,y,w,d) dxdy \quad (5)$$

is the overlap integral. One technique that $C_{12}$ is maximized is by adjusting the three layout parameters W, w and d, with the constraint that the value of d be greater than the photolithographic plus waveguide etch resolution. Field Modes $E_1^0(x,y,W)$ and $E_2^0(x,y,w,d)$ are calculated by a 2-D mode solver.

Figure 4A:
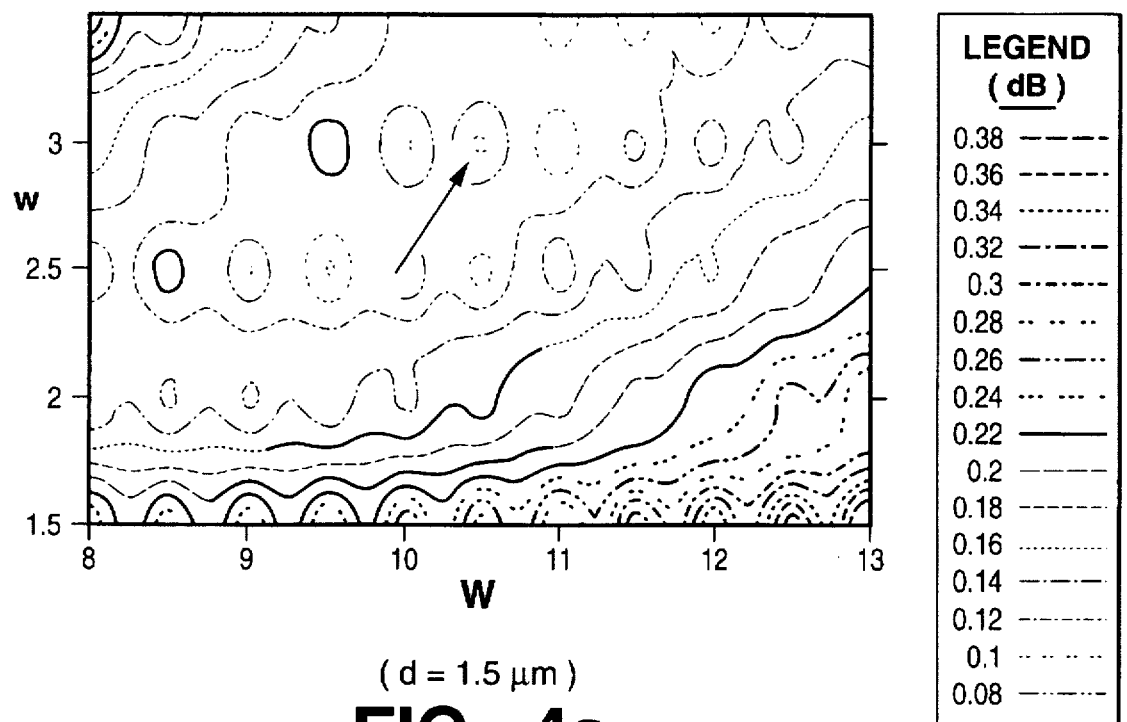
FIG. 4 presents the calculated power transmission P (dB) for splitters with different dimensional parameters.

FIG. 4 illustrates the calculated power P (dB) for a couple of different combinations of the three layout parameters W, w and d. In particular, the results indicate that the minimum is about 0.08 dB for the gap size of d=1.5 µm at W=10.0 µm and w=3.0 µm and 0.13 dB for the gap size of d=2.0 µm at W=10.5 µm and w=2.5 µm as shown in FIGS. 4(a) and (b), respectively.

The calculations presented herein are specific for 6.7 mm thick waveguides with $\Delta \approx 0.6\%$ fabricated at AT&T's Murray Hill facility. These waveguide parameters were chosen because they offer low fiber-waveguide coupling loss. However, the new design principle is by no means limited to a particular waveguide geometry. Any other waveguide structure can be optimized.

Figure 4B:
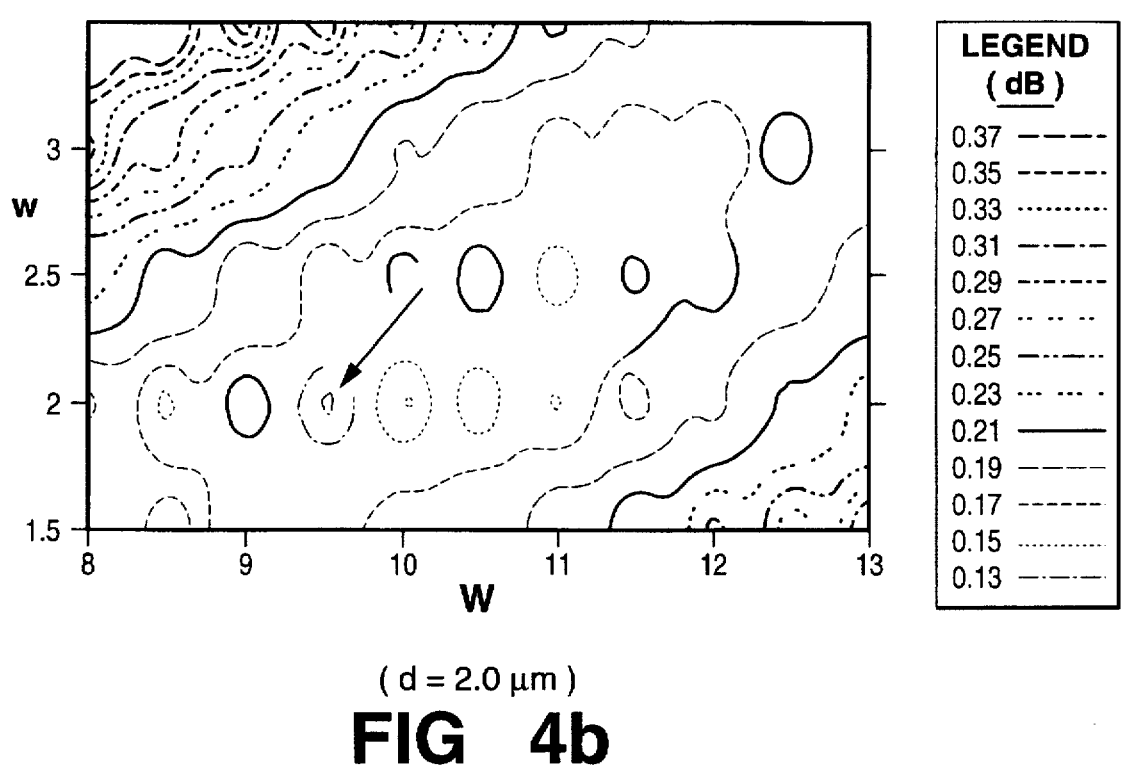

Optimization was done for d=1.5 µm (FIG. 4(a)) and d=2.0 µm (FIG. 4(b)). Both of the waveguide widths W and w are varied to maximize $C_{12}$. The contours represent P values. The optimized parameters for d=2.0 µm are W=10.5 µm, w=2.5 µm, and P=0.13 dB. Although a smaller value of d=1.5 µm gives better loss reduction (0.08 dB) as shown in FIG. 4(b), it is harder to realize during fabrication and thereby would have a lower yield.

Figure 5A:
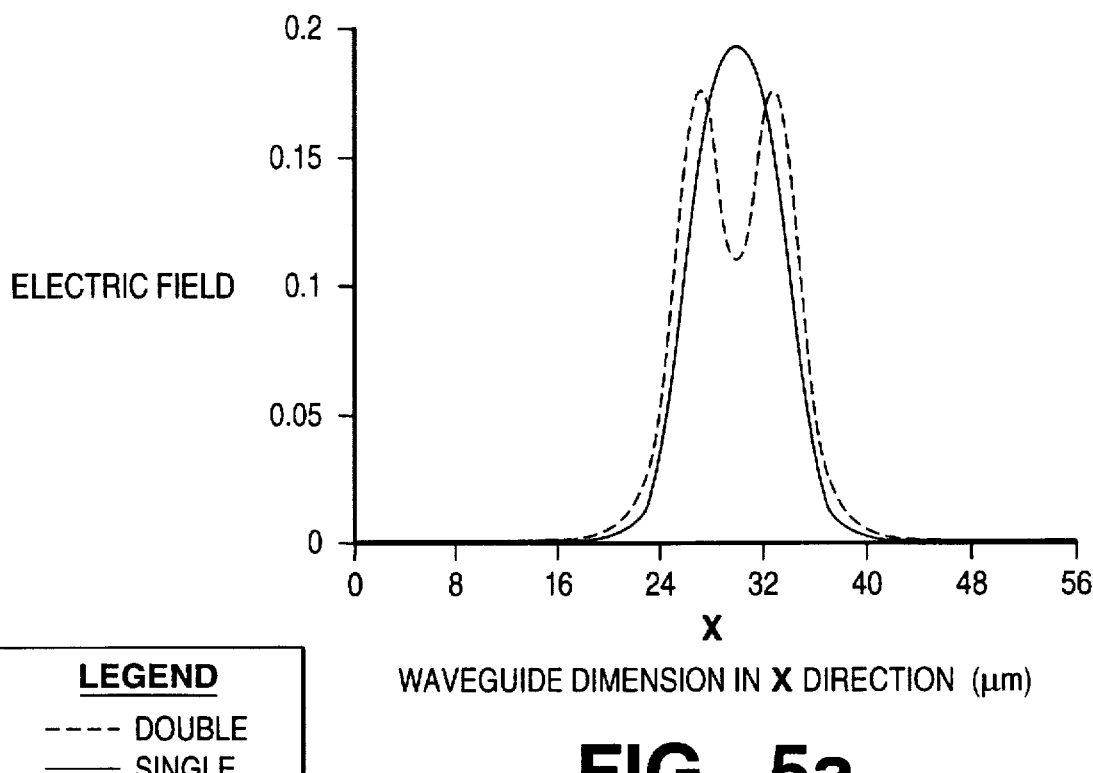
FIG. 5 is an overlap of the electromagnetic fields between the single and pair waveguides before (a) and after (b) optimization.
Figure 5B:
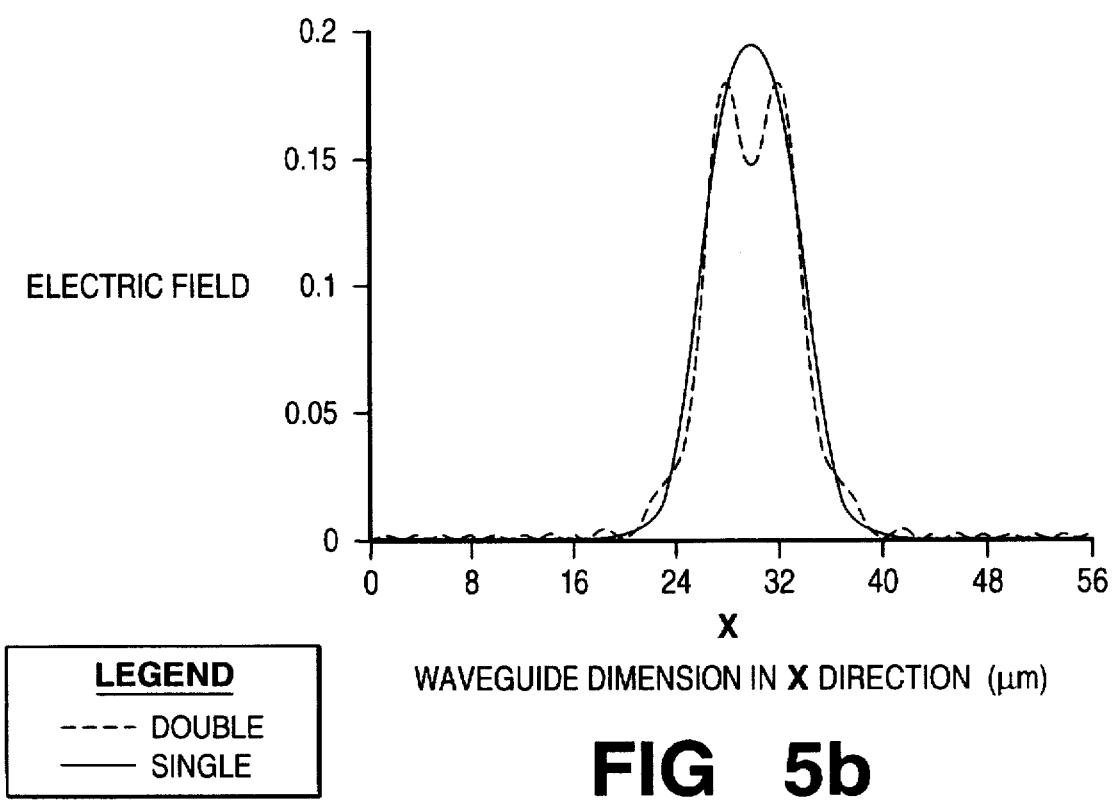

A specific comparison of field mode overlap before and after the optimization is also given in FIG. 5. $E_1^0$ and $E_2^0$ are indicated by solid and dashed lines, respectively. In contrast to the unoptimized case (W=10.5 µm, w=4.25 µm, and d=2.0 µm) in FIG. 5(a). FIG. 5(b) shows a better mode overlap with a set of optimized parameters W=10.5 µm, w=2.5 µm, and d=2.0 µm. The later will yield a significant loss reduction.

Figure 6A:
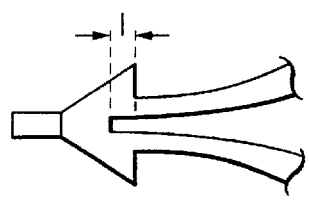
FIG. 6(a)–(f) are a series of schematics of the new configuration of the Y-branch junction power splitter in accordance with the present invention; (a)–(c) are the symmetric Y-branch splitters where the length of the gap 1 can be less, greater or equal to zero; (d) demonstrates the same for the asymmetric Y-branch splitters; (e) further shows that a small transversal gap can be added at the splitting junctions of the Y-branch; (f) finally shows that the number of output waveguides is not limited to two.
Figure 6B:
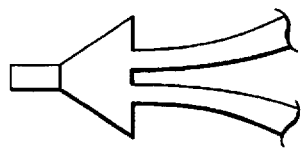
Figure 6C:
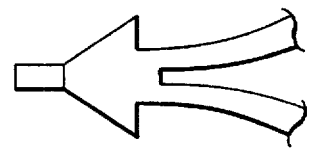

As an alternative embodiment, it may be possible to further improved the above optimization by introducing a fourth parameter, specifically the length of the gap l as shown in FIG. 6(a) and (c). In such configurations there exists a mode transition region where physical anomalies effect the modes present within that region of the device. Through this transition region, additional steps may be required to ensure that the fundamental mode present at the end of this transition region of the device is essentially equal to the fundamental mode of the double waveguide portion of the device. More specifically, that no abrupt mode change occurs at the junction where the double waveguide portion begins. However, in accordance with the present invention, it is understood that BPM techniques may be used to mathematically account for changes in the fundamental mode through the transition region to ensure that the fundamental mode is essentially unchanged at the junction establishing the double waveguide portion of the device.

Figure 6D:
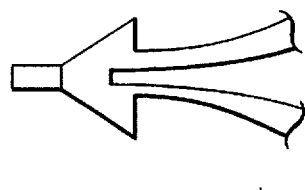
Figure 6D:
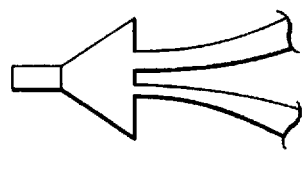
Figure 6D:
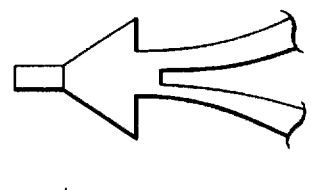

In addition, it should be noted that invention is not only apply to the symmetric splitters but also to the asymmetric ones where the second and third waveguides have an unequal waveguide width as pictured in FIG. 6(d). Therefore, the present invention can accommodate a desire to split the power in proportions other than having an equal amount go to each path of the double waveguide portion. In this regard, the only pint of note may be that the formulas presented hereto have assumed equal widths for the output waveguide portions, namely w, now separate width values say $w_1$ and $w_2$, must be used in the calculations.

Figure 6E:
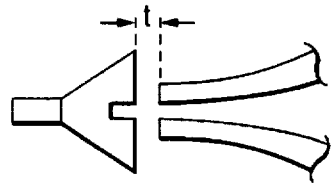
Figure 6E:
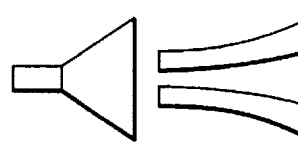
Figure 6E:
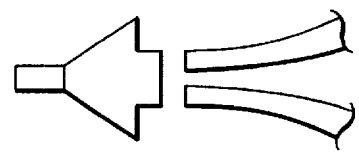
Figure 6E:
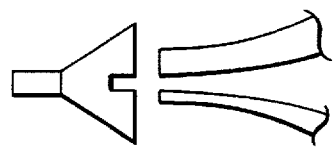
Figure 6E:
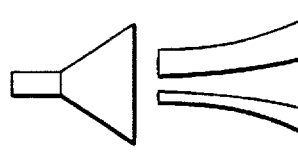
Figure 6E:
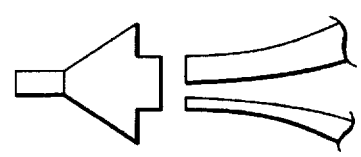
Figure 6F:
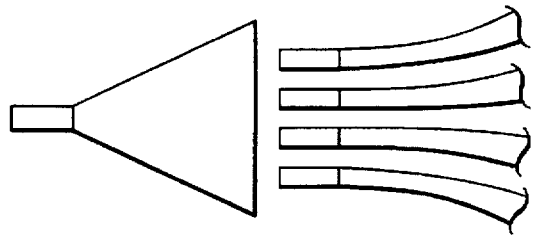

Due to existing imperfections in the manufacturing techniques presently available for making optical devices, realization of the theoretical model in fabrication may present some difficulties. However, it has been recognized that if a transverse gap t, as shown in FIG. 6(e), is intentionally added at the splitter junction the resulting optical device more accurately mirror the projections established by the calculations set forth above. Transverse gap t isolates the various waveguide regions from each other in a manner that under practical manufacturing environments allows for the signals to act more predictable when in the various waveguide regions. Lastly, it is important to note that the present invention is applicable to the Y-branch splitter with more than two output waveguides as shown in FIG. 6(f).

As stated earlier, the present invention recognizes the applicability such a mathematical solution provides to the design of Y-branch junction power splitters such as the novel Y-branch splitter depicted in FIGS. 3 and 6. In particular, the 2-D mode solver assist in establishing the most appropriate physical dimensions for the Y-branch splitter to maximize the mode match at the junction of the splitter so as to reduce excess loss. One of the particular results of the design analysis as described herein is the feature that in order to maximize the mode match is to make the width W larger than the combination of the width of the two output paths w and the width of the gap region d. In other words, that $W > 2w + d$.

Mode computation can be done analytically for very simple geometries such as a slab waveguide. Numerical calculation is often necessary for more complex waveguides using, for example, Galerkin's method (Chiang, 1994, "Review of numerical and approximate methods for modal analysis of general optical dielectric waveguides," *Optical Quantum Electron*, 26 S113–S134). The field is expanded in a complete set of functions converting the wave equation for the mode Eq. 2 into a matrix eigenvalue equation which may be solved with standard subroutine packages such as EISPACK (Smith et al., 1976, *Matrix Eigensystem Routines—EISPACK Guide*, Springer-Verlag, New York). The matrix order is equal to the number of basis functions used to describe the mode.

One particular expansion method or technique is essentially a two dimensional Fourier expansion in which the field is expressed as a sum of products of sine waves of x and y (see Henry and Verbeek, 1989 below). This method is useful if the mode can be described by a relatively small number of waves, e.g., by 10 x-waves and 20 y-waves for a waveguide with symmetry in the x direction.

More specifics of the 2-D mode solver utilized by the present invention are set forth and described in an article by Charles H. Henry and Bart H. Verbeek entitled Solution of the Scalar Wave Equation for Arbitrarily Shaped Dielectric Waveguides by Two-Dimensional Fourier Analysis and printed in Vol. 7, No. 2 February 1989 issue of Journal of Lightwave Technology which is expressly incorporated by reference herein. In general, the method of calculating two-dimensional dielectric waveguide modes consists of expanding the modes in a two-dimensional Fourier series and thereby converting the scalar wave equation into a matrix eigenvalue equation. This method is attractive because of its simplicity, flexibility, ease of application, and because the calculated field is expressed in terms of elementary orthonormal functions.

This method for making an accurate numerical calculation of the nodes of optical waveguides consists of enclosing the waveguide within a rectangle large enough to ensure that the fields of the guided modes of interest are zero at this boundary. The field is then expanded in a double Fourier series in which the sinusoidal basis functions are zero at the boundary. This expansion converts the scalar wave equation into a set of homogeneous linear equations for the Fourier coefficients. The eigenvalues and coefficients of the bound modes are then found by solving the matrix eigenvalue problem by use of the standard EISPACK programs.

The method is valid for arbitrary waveguide geometries with the following provisions:

1) The scalar wave equation is applicable. This is the case when the changes in the refractive index function n(x,y) are small, when the electric field lies parallel to the interfaces of large refractive index change, or when the mode has a small amplitude at such interfaces.

2) The mode is not near cutoff. Near cutoff, the mode extends far beyond the core and fitting both the field of the core and the long tail requires an excessive number of waves.

3) Waveguide induced birefringence is small or of no interest. The scalar wave equation does not distinguish between polarizations.

Figure 7A:
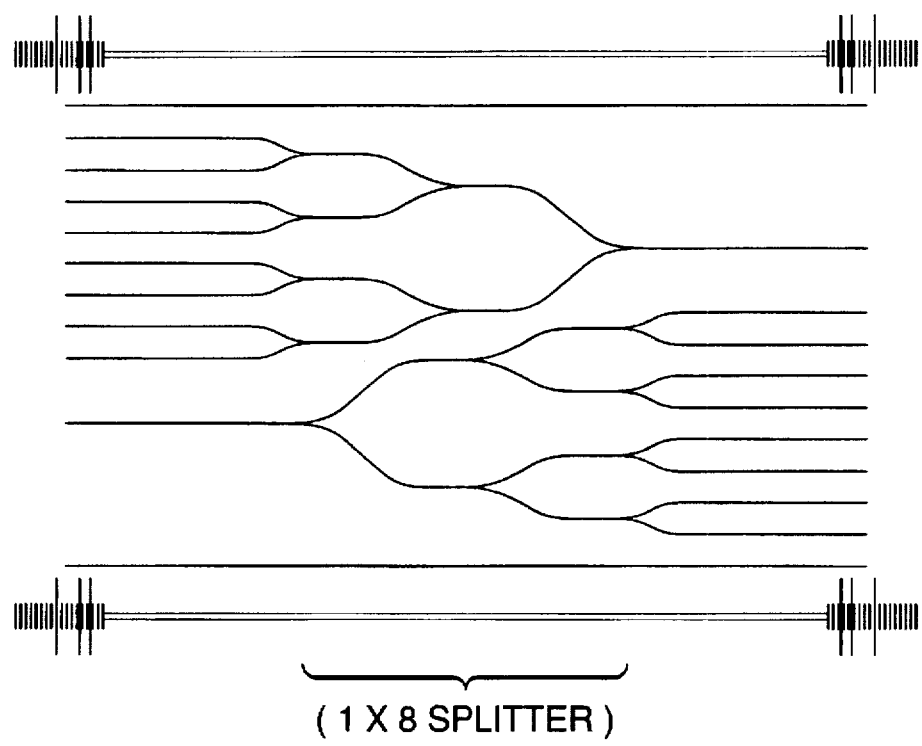
FIG. 7 shows the mask layouts for 1×8 and 1×16 splitter in accordance with the present invention (The vertical dimension is exaggerated on the plot)
Figure 7B:
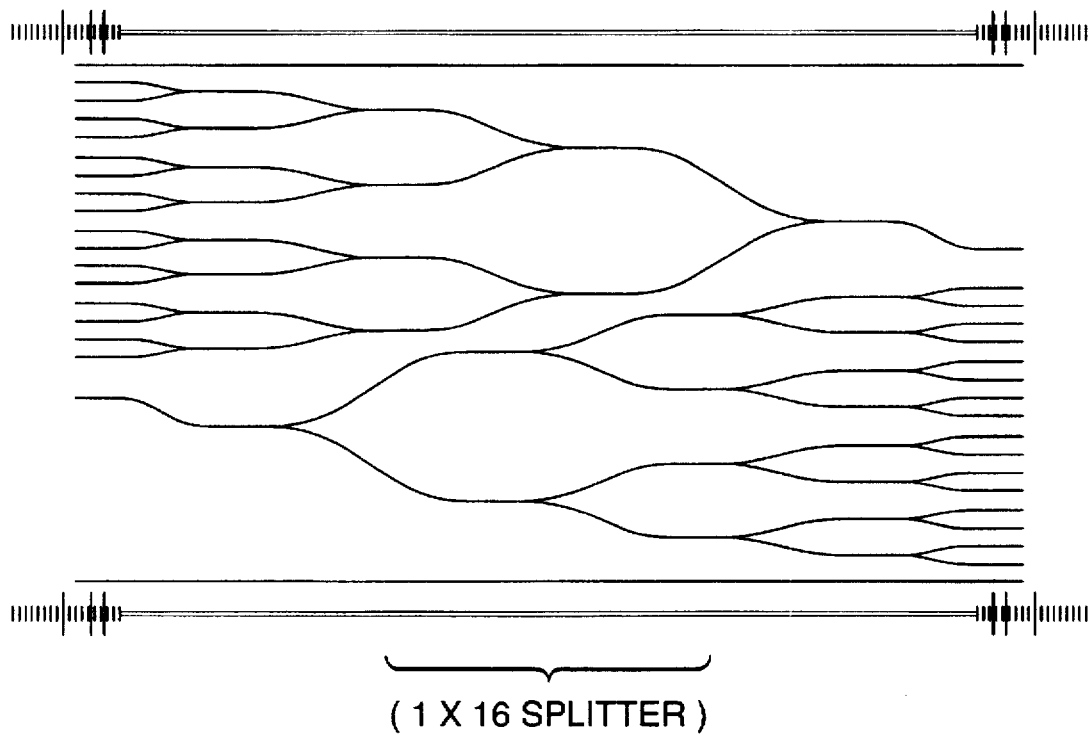

Examples of mask layout for an optimized Y-branch splitter in accordance with the present invention as well as enhanced 1×8, and enhanced 1×16 splitter devices are displayed in FIGS. 7(a) and (b), where the vertical dimension has been expanded for visibility. The layout used the optimized parameters; W=10.5 mm, w=2.5 mm, and d=2.0 mm. The total length of a single Y-branch is about 6 mm. The measured results are shown in FIG. 7(a) for a 1×8 splitter made in accordance with the present invention and FIG. 7(b) for a 1×16. The fiber-waveguide-fiber coupling loss is included in the plotted power transmission.

Intrinsic power loss for a 1×8 and a 1×16 splitter is 9 and 12 dB, respectively. In FIGS. 8(a) and (b), the solid lines represent the wavelength at 1.3 µm while the dashed lines represent 1.55 µm. The polarization effect (TE and TM) is also indicated. Subtracting the coupling loss due to fiber-waveguide-fiber interconnection, the average excess insertion loss per Y-branch splitter is estimated to be about 0.2 dB, which is in good agreement with the calculated values. Also, a 1×8 splitter, interconnected to fiber pigtails with 8° endfaces on both the fibers and waveguide chip, showed reflectivity from the Y-branch structure to be less than −60 dB, making the splitter design of the present invention also acceptable for analog transmission systems. The overall performance of this new Y-branch splitter design, with respect to excess loss, uniformity, polarization sensitivity, and reflectivity, is significantly improved over previous CVD Y-branches, robust to processing variations, and is integrable with other waveguide devices.

Additionally, splitting ratios of about 1×8 or greater these integrated waveguide power splitters compete favorably with discrete fused biconic tapered (FBT) splitters. The waveguide devices have only marginally greater total loss (splitter loss+fiber/waveguide interconnections) than the FBTs, but have better insertion loss uniformity between the output ports, and much lower wavelength dependence of the split ratio. Furthermore, other functions (i.e. WDMs) can be incorporated in the circuit to make a power splitter with enhanced functionality.

In summary, a new optical power splitter is proposed. The transmission characteristics are evaluated in terms of the mode matching principle. The layout parameters are calculated by optimizing the overlap integrals. The physical dimensions of an optimized Y-branch splitter in accordance with the present invention is small and the insertion loss of 0.2 dB has been realized. Lastly, fabricated 1×8 and 1×16 splitter devices demonstrate a satisfactory performance and agree with the calculations.

It is to be understood that the above-described arrangements are simply illustrative of the invention. Other arrangements may be devised by those skilled in the art which will embody the principles of the invention and fall within the spirit and scope thereof.

We claim:

1. An optical power splitter comprising:
   an input waveguide region having a predetermined width (W) and capable of transmitting optical energy having a fundamental mode $E_1^0$;
   at least two output waveguide regions positioned to receive at least a portion the optical energy from the input waveguide region wherein the output waveguide regions each have predetermined widths (w) for a predetermined distance along the path of energy travel and are capable of transmitting optical energy having a fundamental mode $E_2^0$; and wherein each pair of output waveguide regions are separated by a gap of a predetermined width (d) therebetween for a predetermined distance along the path of energy travel; and
   wherein fundamental modes $E_1^0$ and $E_2^0$ are substantially equal at the beginning of the output waveguide regions.

2. The splitter of claim 1 wherein the fundamental modes between the input waveguide region and the output regions are mode matched.

3. The splitter of claim 2 wherein a 2-D mode solver with Fourier expansion methods is used in executing mode-matching principle.

4. The splitter of claim 1 wherein the power transmission coefficient (P) though the junction is defined by:

$$P = -10 \log[C_{12}(W,w,d)]^2,$$

where, $$C_{12}(W,w,d) = \int E_1^0(x,y,W) E_2^0(x,y,w,d) dx dy.$$

5. The splitter of claim 4 wherein $C_{12}(W,w,d)$ through the junction is maximized by adjusting the three layout parameters W, w and d, with the constraint that the value of d be greater than the photolithographic plus waveguide etch resolution.

6. The splitter of claim 1 wherein the width of the input waveguide region is greater than the sum of the widths of the output waveguides and respective gap(s).

7. The spitter of claim 1 wherein the gap size d=1.5 μm, W=10.0 μm and w=3.0 μm.

8. The splitter of claim 1 wherein the gap size d=2.0 μm, W=10.5 μm and w=2.5 μm.

9. The splitter of claim 1 wherein the longitudinal positioning of the gap(s) is offset from the beginning of the output waveguides by a negative or positive value l.

10. The splitter of claim 1 wherein the widths of the output waveguides are not equal to each other.

11. The splitter of claim 1 wherein a transverse gap t is positioned between the input and output waveguides regions.

12. The splitter of claim 1 wherein the number of output waveguides is greater than two.

13. An optical power splitter comprising:
   a input waveguide region having a predetermined width (W) and capable of transmitting optical energy;
   at least two output waveguide regions positioned to receive at least a portion the optical energy from the input waveguide region wherein the output waveguide regions each have predetermined widths (w) for a predetermined distance along the path of energy travel and establish a gap of a predetermined width (d) for a predetermined distance along the path of energy travel between each pair of output waveguides; and
   wherein the width of the input waveguide region is greater than the sum of the widths of the output waveguides and respective gap(s).

14. The splitter of claim 13 wherein the physical dimensions of the widths for the output waveguides, as well as the width of the respective gap(s) are determined based on an evaluation of the transmission characteristics of the splitter in terms of a mode-matching principle.

15. The splitter of claim 13 wherein the longitudinal positioning of the gap(s) is offset from the beginning of the output waveguides by a negative or positive value l.

16. The splitter of claim 13 wherein the widths of the output waveguides are not equal to each other.

17. The splitter of claim 13 wherein a transverse gap t is positioned between the input and output waveguides regions.

18. The splitter of claim 13 wherein the number of output waveguides is greater than two.

19. An optical power splitter comprising:
   a input waveguide region having a predetermined width (W) and capable of transmitting optical energy;
   at least two output waveguide regions positioned to receive at least a portion the optical energy from the input waveguide region wherein the output waveguide regions each have predetermined widths (w) and are separated by a gap of a predetermined width (d) between each pair of output waveguides; and
   wherein the physical dimensions of the widths for the input and output waveguides, as well as the width of the respective gap(s) are determined based on an evaluation of the transmission characteristics of the splitter in terms of a mode matching principle.

20. The splitter of claim 19 wherein a 2-D mode solver with Fourier expansion methods is used in executing mode-matching principle.

* * * * *